(12) United States Patent
Khanna

(10) Patent No.: US 11,899,769 B2
(45) Date of Patent: *Feb. 13, 2024

(54) SECURING DISPLAYED DATA ON COMPUTING DEVICES

(71) Applicant: Microsoft Technology Licensing, LLC, Redmond, WA (US)

(72) Inventor: Varun Khanna, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,101

(22) Filed: Jan. 6, 2023

(65) Prior Publication Data

US 2023/0161857 A1 May 25, 2023

Related U.S. Application Data

(63) Continuation of application No. 16/525,969, filed on Jul. 30, 2019, now Pat. No. 11,574,034.

(51) Int. Cl.
*G06F 21/32* (2013.01)
*G06F 21/62* (2013.01)
*G06V 40/16* (2022.01)

(52) U.S. Cl.
CPC .......... *G06F 21/32* (2013.01); *G06F 21/6245* (2013.01); *G06V 40/162* (2022.01); *G06V 40/168* (2022.01)

(58) Field of Classification Search
CPC ...... G06F 21/32; G06F 21/6245; G06F 21/62; G06F 2221/032; G06F 2221/2111

USPC .......................................................... 726/19
See application file for complete search history.

(56) References Cited

U.S. PATENT DOCUMENTS

| | | | |
|---|---|---|---|
| 9,898,610 B1* | 2/2018 | Hadsall | G06V 40/1365 |
| 2007/0150827 A1* | 6/2007 | Singh | G06F 21/629 |
| | | | 706/20 |
| 2014/0041042 A1* | 2/2014 | Wong | H04M 1/724 |
| | | | 726/26 |
| 2014/0146953 A1* | 5/2014 | Sepic | H04M 3/5166 |
| | | | 379/93.17 |

(Continued)

OTHER PUBLICATIONS

"Office Action Issued in European Patent Application No. 20751341.7", dated Nov. 27, 2023, 4 Pages.

*Primary Examiner* — Samson B Lemma
(74) *Attorney, Agent, or Firm* — Barta Jones, PLLC

(57) ABSTRACT

Techniques for securing displayed data on computing devices are disclosed. One example technique includes upon determining that the computing device is unlocked, capturing and analyzing an image in a field of view of the camera of the computing device to determine whether the image includes a human face. In response to determining that the image includes a human face, the technique includes determining facial attributes of the human face in the image via facial recognition and whether the human face is that of an authorized user of the computing device. In response to determining that the human face is not one of an authorized user of the computing device, the technique includes converting user data on the computing device from an original language to a new language to output on a display of the computing device, thereby securing the displayed user data even when the computing device is unlocked.

20 Claims, 7 Drawing Sheets

(56) References Cited

U.S. PATENT DOCUMENTS

| | | | |
|---|---|---|---|
| 2015/0100602 A1* | 4/2015 | Lopera | G06F 21/6245 |
| | | | 707/783 |
| 2015/0128291 A1* | 5/2015 | Hyodo | G06F 21/6218 |
| | | | 726/28 |
| 2016/0357947 A1* | 12/2016 | Cohen | G09G 3/2003 |
| 2016/0360152 A1* | 12/2016 | Karimi-Cherkandi | |
| | | | H04W 12/02 |
| 2017/0068785 A1* | 3/2017 | Experton | H04W 12/02 |
| 2020/0243094 A1* | 7/2020 | Thomson | G10L 15/32 |

* cited by examiner

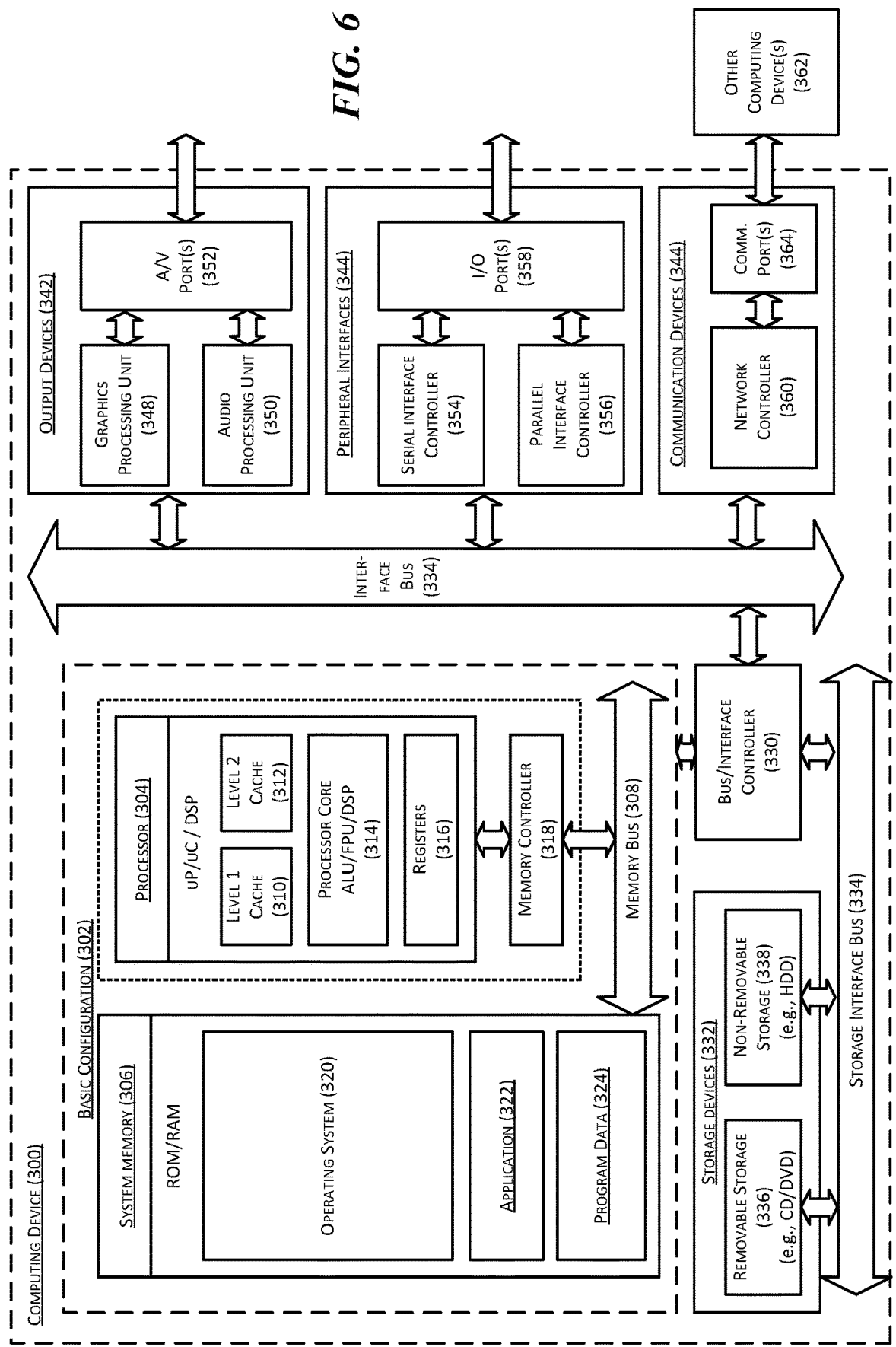

SECURING DISPLAYED DATA ON COMPUTING DEVICES

CROSS-REFERENCE TO RELATED APPLICATION

This non-provisional utility application is a continuation of U.S. application Ser. No. 16/525,969 entitled "SECURING DISPLAYED DATA ON COMPUTING DEVICES" and filed on Jul. 30, 2019 which is incorporated herein in its entirety by reference.

BACKGROUND

Smartphones, laptops, tablet computers, and other types of computing devices typically include certain access control features to protect privacy and security of data on computing devices. For example, a smartphone can be secured with a password, a passcode, a fingerprint, a facial image, or other suitable types of credential. In a locked or secured mode, the smartphone can be display only non-private data, such as a current date, time, weather forecast, etc. An authorized user can unlock the smartphone by providing a valid credential to gain access to private data on the smartphone. Examples of private data can include personal photos, contact information, personal identification information (e.g., social security numbers), health information, or other suitable types of data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Even though computing devices, such as smartphones, can be secured with various types of credentials, such a single layer security can still pose security risks to private data on computing devices. For example, an unauthorized user can unlock a smartphone with a compromised password/passcode or a forged fingerprint or facial image. Upon unlocking the smartphone, the unauthorized user can have full access to all private data on the smartphone even though the user is not authorized to view such private data. In another example, a smartphone can be accidentally unlocked, for instance, when being connected to a trusted Bluetooth speaker or headphone. Upon being unlocked, anyone can access the private data on the smartphone without providing credentials.

Several embodiments of the disclosed technology can address at least some aspects of the foregoing security risks by implementing an additional layer of security on smartphones, tablet computer, laptops, or other suitable types of computing devices. In certain implementations, a computing device can include a camera, a processor, and a memory operatively coupled to one another. The memory can include instructions executed by the processor to provide a security agent that is configured to utilize the camera to capture an image in a field of view of the camera (e.g., a front-facing camera, a back-facing camera, or a combination thereof). The security agent can then be configured to analyze the captured image to determine whether the image includes one or more human faces, bodies, or other suitable anatomical parts. The descriptions herein use human faces to illustrate aspects of the disclosed technology. In other implementations, similar and/or additional analysis can be performed based on human bodies, postures, and/or other suitable anatomical features.

In certain embodiments, in response to determining that the image includes at least one human face, the security agent can be configured to determine one or more facial attributes of the human face by applying suitable facial recognition techniques. Based on the determined facial attributes, the security agent can be configured to determine whether only an authorized user is in the field of view of the camera. In response to determining that only the authorized user is in the field of view of the camera, the security agent can be configured to allow full or pre-configured access to private data on the computing device. On the other hand, in response to determining that at least one unauthorized user is in the field of view of the camera, the security agent can be configured to apply certain security techniques to obfuscate, obscure, or otherwise secure display of the private data on the computing device.

In one implementation, the security agent can be configured to convert private data from an original language into a new language that an unauthorized user is unlikely to understand. Conversion of the private data from the original language into the new language can be via machine translation or other suitable techniques. For example, private data originally in English can be machine translated to Latin, Thai, or other suitable languages. In other examples, versions of the private data can be pre-generated via human translation or other suitable language conversion techniques.

The security agent can be configured to select a new language that an unauthorized user is unlikely to understand in various ways. In one example, the security agent can be configured to determine a location (e.g., Thailand) of the computing device via, for instance, a global position system (GPS) sensor of the computing device. Based on the determined location, the security agent can be configured to select a new language (e.g., Latin) that is unlikely to be understood at the determined location. For example, the security agent can be configured to select the new language from a set of languages based on an adoption rate in the determined location. As such, the selected new language can have an adoption rate that is less than an adoption threshold (e.g., 1%) at the determined location, i.e., less than 1% of population at the determine location can understand the new language.

In another example, the security agent can also be configured to select the new language based on a race or ethnicity predicted according to the facial attributes of the image captured in the field of view of the camera. For instance, the security agent can determine that the facial attributes correspond to a person who is mostly likely Scandinavian. In response, the security agent can be configured to select a new language (e.g., Swahili) that is unfamiliar to the population in Scandinavia based on an adoption threshold.

In a further example, an authorized user can pre-configure one or more new languages for the security agent to use for one or more locations. For example, the authorized user can pre-configure a first language to be used at a first location and a second language to be used at a second location. For instance, Thai for United States while Danish for Japan. In another example, the authorized user can specify multiple languages for one or more of the locations. The security agent can be configured to select one of the specified languages based on, for instance, an adoption rate of each of the multiple languages. As such, the selected language can have a lowest adoption rate or based on other suitable criteria.

In yet further examples, the computing device can also include a microphone or other suitable types of sound sensor. The security agent can be configured to capture a sound signal from an environment in which the computing device is located. The security agent can then be configured to analyze the captured sound signal to identify one or more languages from the sound signal via, for instance, speech recognition based on a language library. Based on the identified one or more languages (e.g., Vietnamese and Thai) in the environment, the security agent can be configured to select the new language (e.g., Portuguese) that is unlikely to be commonly understood or adopted in a population that commonly adopts the identified one or more languages. The selected new language can have an adoption rate that is less than an adoption threshold (e.g., 1%) for a population having another adoption rate of the identified language higher than another adoption threshold (e.g., 90%).

In a further example, the security agent can be configured to uniquely identify a person in the field of view of the camera. In one embodiment, the security agent can be configured to access a facial identification library having records of persons containing corresponding facial attributes, associated languages, or other suitable information. Based on the determined facial attributes from the image, the security agent can be configured to uniquely identify the person by comparing the facial attributes to those in the records of the facial identification library. Upon identifying the person in the field of view, the security agent can be configured to access a record of the person to determine one or more languages associated with the person and select a new language that the identified person would not understand or adopt.

In other implementations, the security agent can also be configured to obfuscate any displayed private data in a format or font that is understandable by the authorized user but less likely be understood by unauthorized users. For example, the security agent (or other suitable components on the computing device) can be configured to auto-generate a custom font based on the authorized user's handwriting. The custom font can be created by parsing one or more images of the authorized user's handwritten sample text. The authorized user can also optionally provide additional custom fonts for a language of choice. Once the custom font is generated, the security agent can be configured to modify an original private data by applying the custom font to generate a text that is, for instance, similar to the authorized user's handwriting. In another example, the security agent can also be configured to replace certain words or phrases in the private data with associated images or emoticons. In yet another example, the security agent can also be configured to replace certain data (e.g., social security numbers, birthdays, etc.) with random characters or punctuation marks, such as asterisks, dashes, etc. In further examples, the security agent can be configured to changing an orientation, a font color, a display brightness/contrast of the displayed private data in addition to or in lieu of the foregoing techniques of obfuscating the displayed private data.

Several embodiments of the disclosed technology can thus provide an additional layer of security measures in addition to or in lieu of passwords, passcodes, fingerprints, facial images, etc. for unlocking a computing device. Even when an unauthorized user gains access to the computing device, by, for instance, using a compromised password or passcode, the unauthorized user would not have access to information in the private data. For example, the private data may be in a new language that the unauthorized user does not understand, or the private data may be displayed in a custom font resembling the authorized user's handwriting. As such, security to private data on the computing device can be improved, and access to information in the private data can be limited to unauthorized users.

BRIEF DESCRIPTION OF THE DRAWINGS

FIG. 6 is a computing device suitable for certain components of the computing system in FIGS. 1-3D.

DETAILED DESCRIPTION

Figure 1:
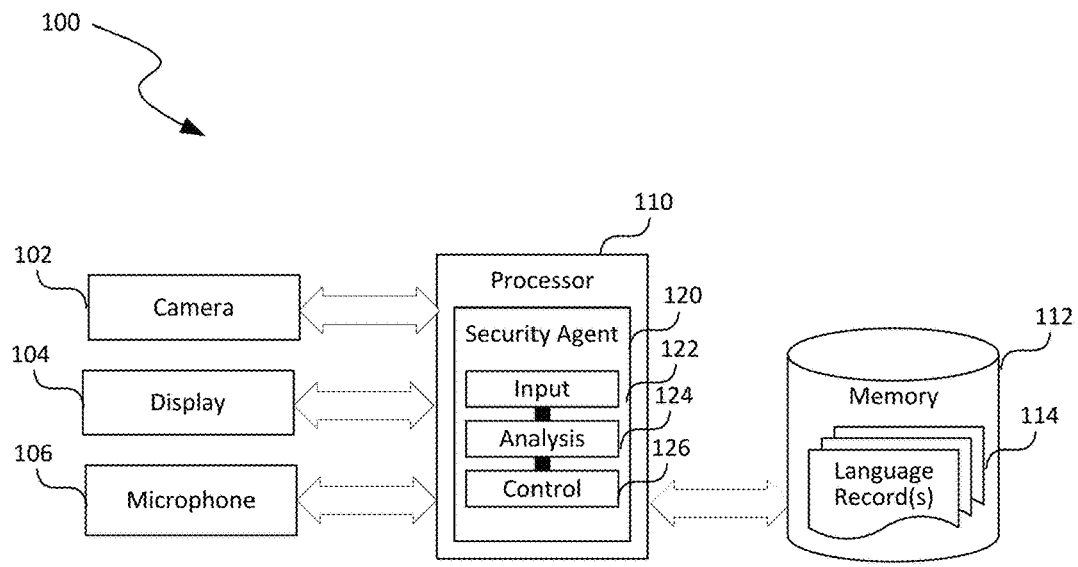
FIG. 1 is a schematic diagram illustrating various components of a computing device configured to secure displayed user data on the computing device in accordance with embodiments of the disclosed technology.

Certain embodiments of systems, devices, components, modules, routines, data structures, and processes for securing displayed data on computing devices are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, the term "locked" generally refers to an operating mode of a computing device that is secured with a password, a passcode, a fingerprint, a facial image, or other suitable types of credential. When the computing device is locked, the computing device only allows limited output of data on a display of the computing device. For example, a locked computing device (e.g., a smartphone) can allow display of non-private data, such as a date, time, weather forecast, or other suitable data not associated with an authorized user of the computing device. In contrast, the term "unlocked" generally refers to another operating mode of the computing device that allows access and display of private data or other suitable types of content related to the authorized user. The computing device can be unlocked with a password, a passcode, a fingerprint, a facial image, or other suitable types of credential. Examples of private data includes personal photos, contact information, personal identification information (e.g., social security numbers), health information, or other suitable types of data.

Also used herein, the term "facial recognition" generally refers to a technology capable of identifying or verifying a person from a digital image or a video frame from a video source. One example technique includes comparing selected facial features or facial attributes from a given image with those in records of a database. For example, a facial recognition technique can identify facial features by extracting landmarks from an image of a human face. Example landmarks include relative position, size, and/or shape of eyes, nose, cheekbones, and jaw. These facial attributes can then be used to search for other images with matching facial attributes. Other example techniques can also include skin texture analysis, three-dimensional recognition, and other suitable techniques.

Further used herein, the term "language adoption" or "adoption" generally refers to skills of reading, speaking, listening, or otherwise understanding or discern meanings of expressions in a language. Different regions, countries, populations may have different adoption rates of certain languages. For example, a language (e.g., Danish) may have a low adoption rate in Asian countries, such as Thailand and Vietnam. In another example, a population (e.g., population in Taiwan) with a high adoption rate of a first language (e.g., Chinese) may have a low adoption rate of a second language (e.g., Hindi). Records of adoption rates can be compiled for various regions, countries, and populations and used to secure displayed data on computing devices, as described herein.

Even though computing devices, such as smartphones, can be secured with various types of credentials, such a single layer security can still pose security risks to private data on computing devices. For example, an unauthorized user can unlock a smartphone with a compromised password/passcode or a forged fingerprint or facial image. Upon unlocking the smartphone, the unauthorized user can have full access to all private data on the smartphone even though the user is not authorized to view such private data. In another example, a smartphone can be accidentally unlocked, for instance, when being connected to a trusted Bluetooth speaker or headphone. Upon being unlocked, anyone can access the private data on the smartphone without providing credentials.

Several embodiments of the disclosed technology can address at least some aspects of the foregoing security risks by implementing an additional layer of security on smartphones, tablet computer, laptops, or other suitable types of computing devices. In certain implementations, upon determining that the computing device is unlocked, a security agent on the computing device can be configured to capture and analyze an image in a field of view of the camera of the computing device to determine whether the image includes a human face. In response to determining that the image includes a human face, the security agent can be configured to determine facial attributes of the human face in the image via facial recognition and whether the human face is that of an authorized user of the computing device. In response to determining that the human face is not one of an authorized user of the computing device, the security agent can be configured to convert user data on the computing device from an original language to a new language upon receiving a request to output the user data on the display of the computing device. As such, the outputted user data on the display of the computing device can be secured even when the computing device is unlocked, as described in more detail below with reference to FIGS. 1-6.

FIG. 1 is a schematic diagram illustrating various components of a computing device 100 configured to secure displayed user data on the computing device 100 in accordance with embodiments of the disclosed technology. In FIG. 1 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1, the computing device 100 can include a camera 102, a display 104, a microphone 106, a processor 110, and a memory 112 operatively coupled to one another. The computing device 100 can be a smartphone, a laptop computer, a tablet computer, a desktop computer, a computer server, and/or other suitable types of computing device. Even though the camera 102, the display 104, and the microphone 106 are shown as integral parts of the computing device 100, in certain implementations, at least one of the camera 102, the display 104, and the microphone 106 can be remote from and communicatively coupled to the processor 110 via a wired/wireless connection. In further implementations, the computing device 100 can include a keyboard, a network interface card, a speaker, and/or other suitable components in addition to or in lieu of those shown in FIG. 1.

The camera 102 can be configured to capture an image in a field of view of the camera 102 and provide the image to the processor 110 for further processing. In certain embodiments, the camera 102 can include front facing lenses at the computing device 100. In other embodiments, the camera 102 can include both front facing and rear facing lenses. The display 104 can be configured to output data to a user, and in certain embodiments, also to receive user input. In one example, the display 104 can include a touchscreen. In other examples, the display 104 can include a liquid crystal display, a light emitting diode, or other suitable types of display. The microphone 106 can be configured to capture a sound signal from an environment in which the computing device 100 is located.

As shown in FIG. 1, the memory 112 can include one or more language records 114 configured by an authorized user 101 (FIG. 2) for applying additional security measures to private data 107 (FIG. 2) of the authorized user 101 on the computing device 100. In certain examples, the individual language records can contain identification of one or more languages adopted by the authorized user 101 of the computing device 100. In other examples, the individual language records can also contain identification of one or more languages pre-configured by the authorized user 101 of the computing device 100 to be used for a corresponding location in lieu of a default language. An example data schema suitable for the language records is described in more detail below with reference to FIG. 4.

Also shown in FIG. 1, the processor 110 can be configured to execute suitable instructions, for example, from the memory 112 to provide a security agent 120 for providing additional security for user data or content on the computing device 100. As described in more detail below, the security agent 120 can be configured to utilize the camera to capture and analyze an image in a field of view of the camera 102. The security agent can then be configured to analyze the captured image to determine whether to apply various security measures to private data 107 (FIG. 2) on the computing device 100. In the illustrated embodiment, the security agent 120 can include an input component 122, an analysis component 124, and a control component 126. In other embodiments, the security agent 120 can also include an output component, a network component, and/or other suitable types of components.

The input component 122 can be configured to interface with the camera 102, the display 104, the microphone 106, and other suitable components (e.g., an operating system) of the computing device 100. For example, the input component 122 can be configured to receive an indication from the operating system that indicates to the security agent 120 that the computing device 100 is unlocked. In response to receiving the indication, the input component 122 can be configured to utilize the camera 102 to capture an image in a field of view of the camera 102.

The input component 122 can then forward the captured image to the analysis component 124 to analyze the captured image and determine whether the image includes one or more human faces, bodies, or other suitable anatomical parts. In certain implementations, the analysis component 122 can utilize various object detection models (not shown) developed via, for instance, machine learning techniques. In other implementations, the analysis component 122 can utilize preconfigured rules, conditions, and/or other suitable criteria for determining whether the captured image includes a human face or other anatomical parts.

In certain embodiments, in response to determining that the image includes at least one human face, the analysis component 122 can be configured to determine one or more facial attributes of the human face in the image by applying suitable facial recognition techniques. Based on the determined facial attributes, the analysis component 122 can be configured to determine whether only an authorized user 101 (shown in FIG. 2) is in the field of view of the camera 102.

Figure 2:
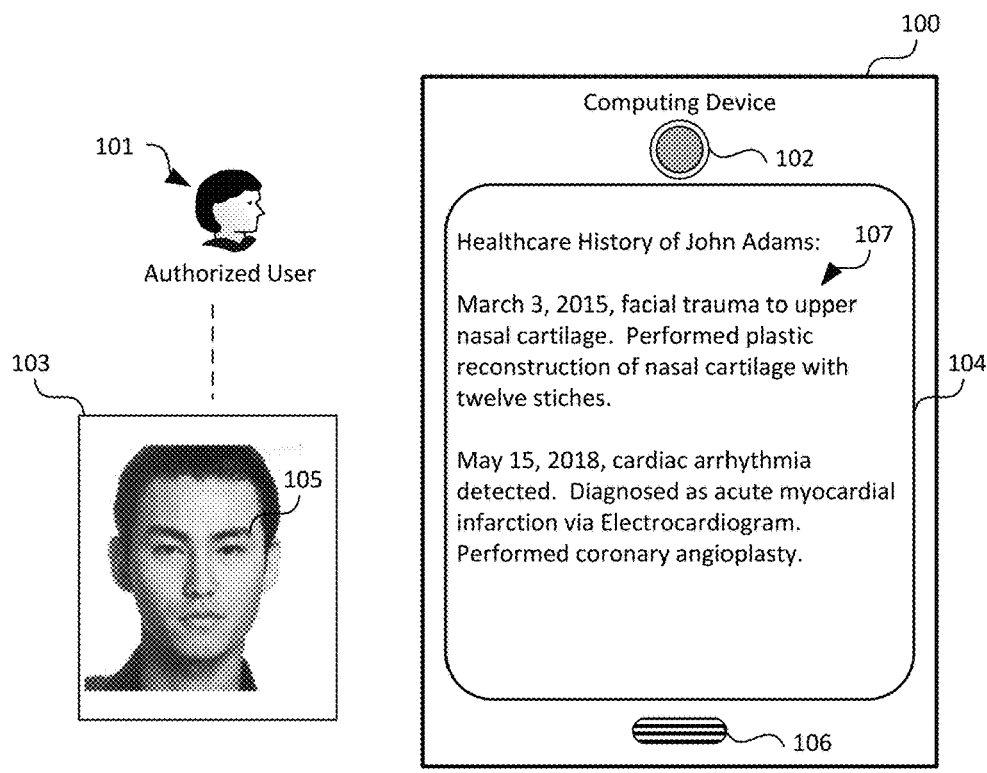
FIG. 2 is a schematic diagram illustrating an example front view of the computing device when operated by an authorized user in accordance with embodiments of the disclosed technology.

In response to determining that only the authorized user 101 is in the field of view of the camera 102, the analysis component 122 can be configured to indicate to the control component 126 to allow full or pre-configured access to private data or content on the computing device 100. For example, as shown in FIG. 2, the camera 102 can be configured to capture an image 103 that includes a face 105. By determining various facing attributes, the analysis component 124 can determine that the face 105 belongs to an authorized user 101. In response, the analysis component 124 can indicate to the control component 126 to output private data 107 of the authorized user 101 without applying various security techniques described in more detail below. In the illustrated example, the outputted private data 107 in the display 104 includes the authorized user's medical history listed below:

"Healthcare History of John Adams:
Mar. 3, 2015, facial trauma to upper nasal cartilage. Performed plastic reconstruction of nasal cartilage with twelve stiches.
May 15, 2018, cardiac arrhythmia detected. Diagnosed as acute myocardial infarction via Electrocardiogram. Performed coronary angioplasty."

In other examples, the private data 107 can also include social security numbers, passwords, and/or other suitable types of data. On the other hand, in response to determining that at least one unauthorized user 101' (shown in FIGS. 3A-3D) is in the field of view of the camera 102, the analysis component 122 can be configured to indicate to the control component 126 to apply certain security techniques to obfuscate, obscure, or otherwise secure display of the private data outputted on the display 104 of the computing device 100, as described below in more detail with reference to FIGS. 3A-3D.

Figure 3A:
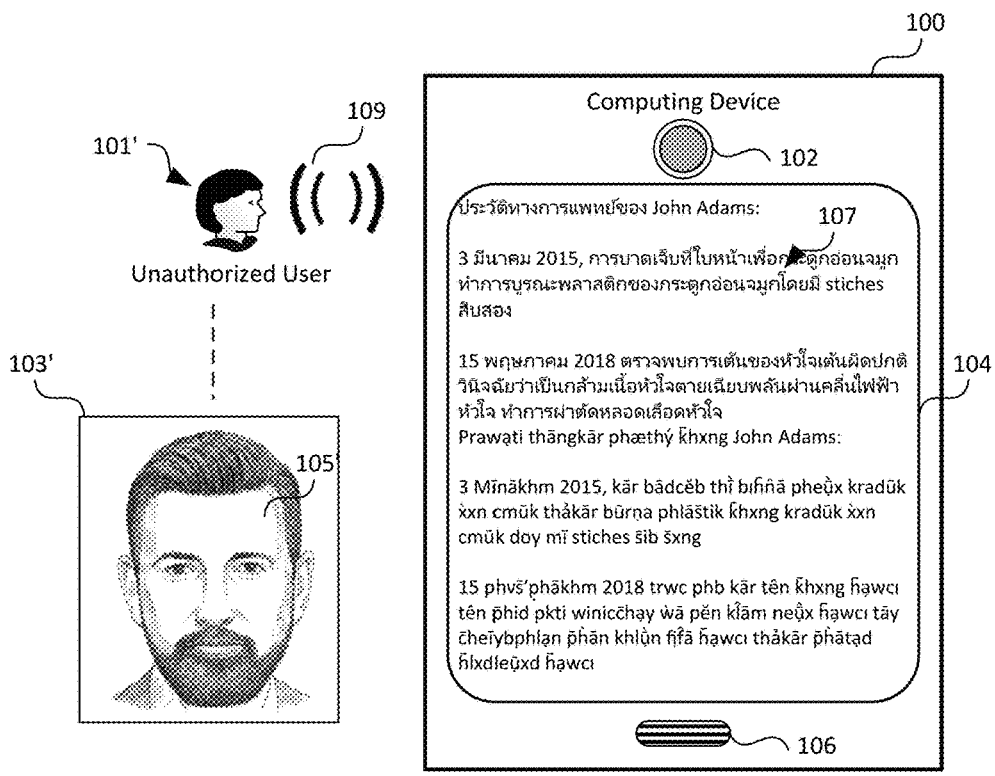
FIGS. 3A-3D are schematic diagrams illustrating example front views of the computing device when operated by an unauthorized user in accordance with embodiments of the disclosed technology.

As shown in FIG. 3A, the analysis component 124 (FIG. 1) can be configured to capture and analyze the image 103' and determine that the image 103' includes a face 105' of an unauthorized user 101'. In response, the analysis component 124 can be configured to indicate to the control component 126 (FIG. 1) to convert any private data 107 requested to be outputted on the display 104 from an original language into a new language that the unauthorized user 101' is unlikely to understand but has been adopted by the authorized user 101 (FIG. 1). The control component 126 can then convert the private data 107 from the original language into the new language via machine translation or other suitable techniques. For example, as shown in FIG. 1A, the private data 107 originally in English can be machine translated to Thai or other suitable languages. In other examples, versions of the private data 107 can be pre-generated via human translation or other suitable language conversion techniques.

Prior to or during conversion of the private data 107, the control component 126 can be configured to select the new language that an unauthorized user 101' is unlikely to understand in various ways. In one example, the control component 126 can be configured to determine a location (e.g., Finland) of the computing device 100 via, for instance, a global position system (GPS) sensor (not shown) of the computing device 100. Based on the determined location, the control component 126 can be configured to select a new language (e.g., Thai) that is unlikely to be understood at the determined location. For instance, the control component 126 can be configured to select the new language from a set of languages based on an adoption rate in the determined location. As such, the selected new language can have an adoption rate that is less than an adoption threshold (e.g., 1%) at the determined location, i.e., less than 1% of population at the determine location can understand the new language.

In another example, the control component 126 can also be configured to select the new language based on a race or ethnicity predicted according to the facial attributes of the image 103' captured in the field of view of the camera 102. For instance, as shown in FIG. 3A, the control component 126 can be configured to determine that the facial attributes of the face 105' in the image 103' correspond to a person who is mostly likely Scandinavian. In response, the control component 126 can be configured to select a new language (e.g., Thai) that is unfamiliar to the population in Scandinavia based on an adoption threshold.

In a further example, the authorized user 101 (FIG. 2) can pre-configure one or more new languages for the control component 126 to use for one or more locations. For example, the authorized user 101 can pre-configure a first language to be used at a first location and a second language to be used at a second location. For instance, Thai for United States while Danish for Japan. In another example, the authorized user can specify multiple languages for one or more of the locations. The control component 126 can be configured to select one of the specified languages based on, for instance, an adoption rate of each of the multiple pre-configured languages. As such, the selected language can have a lowest adoption rate or based on other suitable criteria.

In yet further examples, the control component 126 can be configured to capture a sound signal 109 from an environment in which the computing device 100 is located. The control component 126 can then be configured to analyze the captured sound signal 109 to identify one or more languages from the sound signal 109 via, for instance, speech recognition based on a language library stored at the computing device 100 or accessible via a computer network (not shown). Based on the identified one or more languages (e.g., Danish) in the environment, the control component 126 can be configured to select the new language (e.g., Thai) that is unlikely to be commonly understood or adopted in a population that commonly adopts the identified one or more languages. The selected new language can have an adoption rate that is less than an adoption threshold (e.g., 1%) for a population having another adoption rate of the identified language higher than another adoption threshold (e.g., 90%).

Figure 3B:
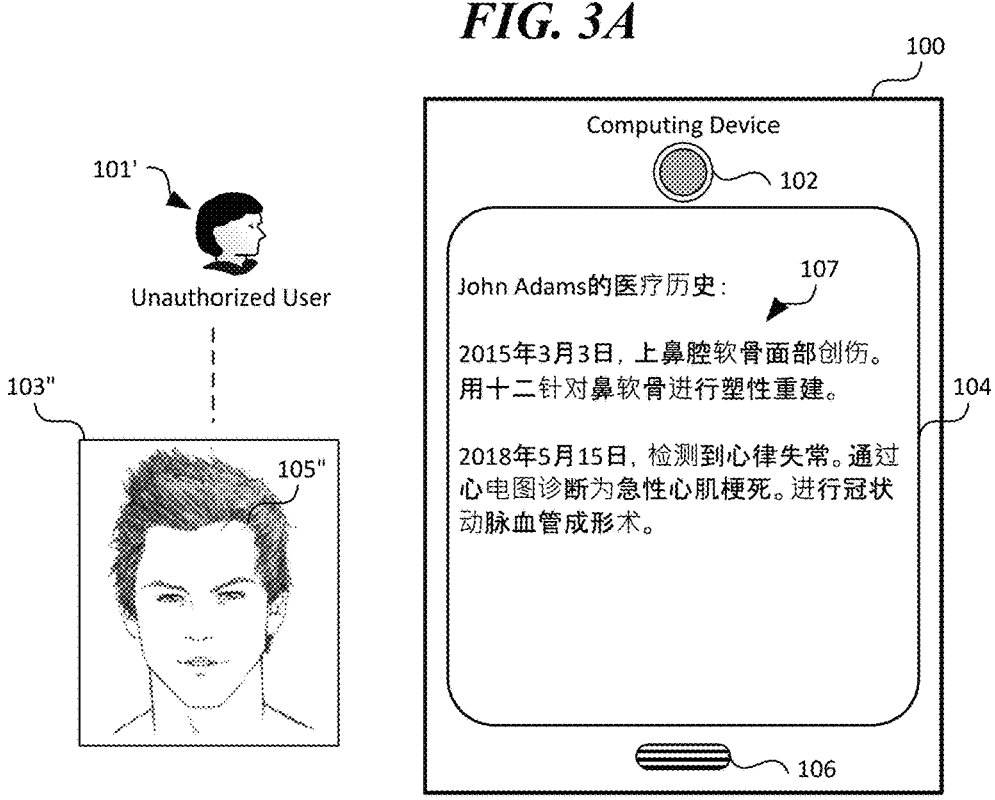

In a further example, the control component 126 can be configured to uniquely identify a person in image 103" captured in the field of view of the camera 102, as shown in FIG. 3B. In the illustrated embodiment, the control component 126 can be configured to access a facial identification library (not shown) having records of persons containing corresponding facial attributes, associated languages, or other suitable information. Based on the determined facial attributes from the image 103", the control component 126 can be configured to uniquely identify the person by comparing the facial attributes of the face 105" to those in the records of the facial identification library. Upon identifying the person in the field of view, the control component 126 can be configured to access a record of the person to determine one or more languages associated with the person and select a new language that the identified person would not understand or adopt.

Figure 3C:
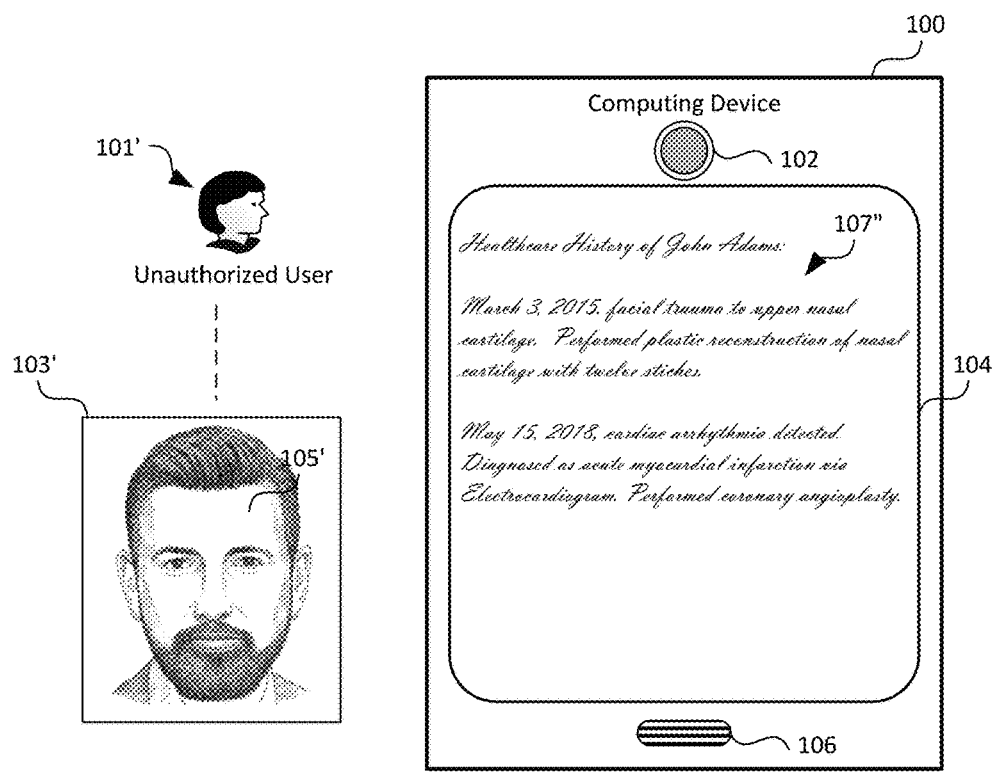

In other implementations, as shown in FIG. 3C, the control component 126 (FIG. 1) can also be configured to obfuscate any displayed private data 107 in a format or font that is understandable by the authorized user 101 (FIG. 2) but less likely be understood by unauthorized users 101'. For example, the control component 126 (or other suitable components on the computing device 100) can be configured to auto-generate a custom font based on the authorized user's handwriting. The custom font can be created by parsing one or more images of the authorized user's handwritten sample text. The authorized user 101 can also optionally provide additional custom fonts for a language of choice. Once the custom font is generated, the control component 126 can be configured to modify an original private data 107 (shown in FIG. 2) by applying the custom font to generate a text of the private data 107" that is, for instance, similar to the authorized user's handwriting.

Figure 3D:
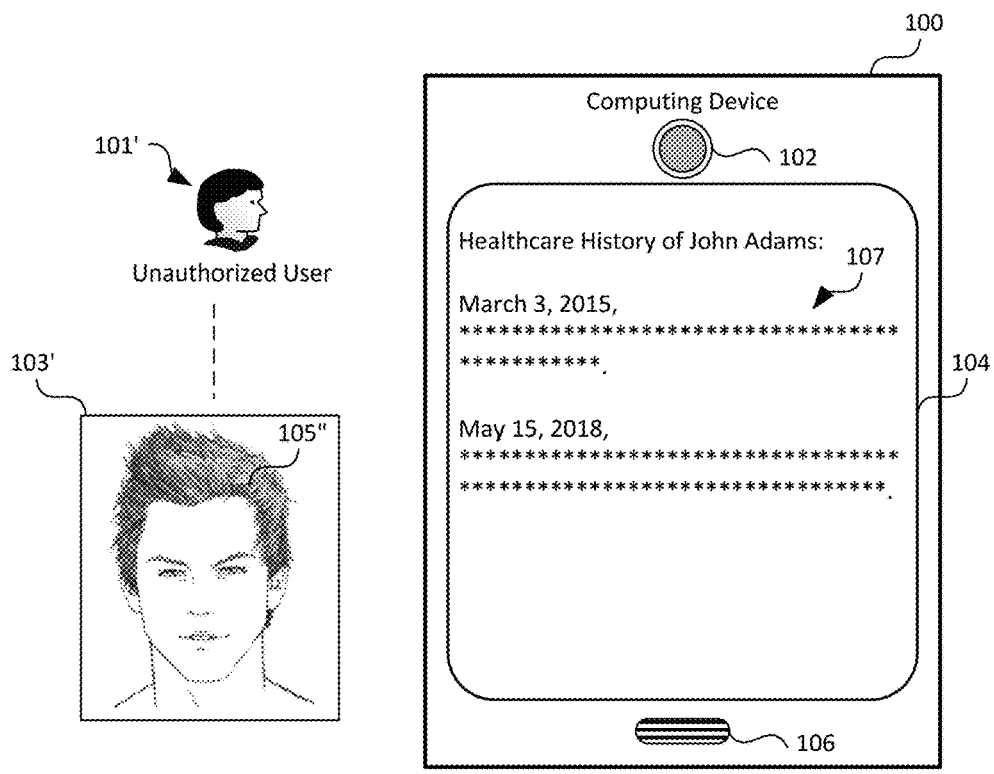

In a further example, as shown in FIG. 3D, the control component 126 (FIG. 1) can also be configured to replace certain data with random characters or punctuation marks, such as asterisks, dashes, etc. In the illustrated example, the authorized user's private data 107 is replaced with asterisks. In other examples, the control component 126 can also be configured to replace certain words or phrases in the private data 107 (FIG. 2) with associated images or emoticons. In further examples, the control component 126 can be configured to changing an orientation, a font color, a display brightness/contrast of the displayed private data 107" in addition to or in lieu of the foregoing techniques of obfuscating the displayed private data 107".

Several embodiments of the disclosed technology can thus provide an additional layer of security measures in addition to or in lieu of passwords, passcodes, fingerprints, facial images, etc. for unlocking a computing device 100. Even when an unauthorized user 101' gains access to the computing device 100, by, for instance, using a compromised password or passcode, the unauthorized user 101' would not have access to information in the private data 107. For example, the private data 107 may be in a new language that the unauthorized user 101' does not understand, or the private data 107 may be displayed in a custom font resembling the authorized user's handwriting. As such, security to private data 107 on the computing device can be improved, and access to information in the private data 107 can be limited to unauthorized users 101'.

Figure 4:
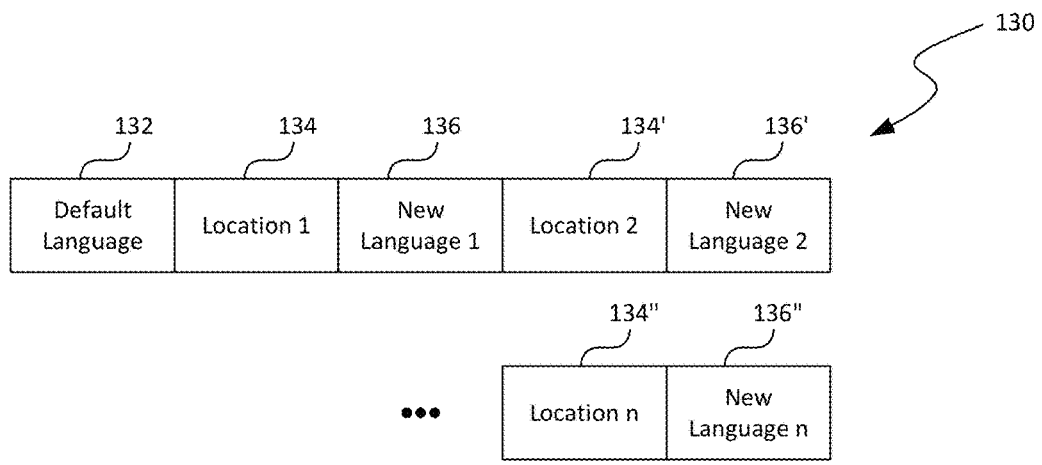
FIG. 4 is a schematic diagram illustrating an example data schema for a language record in accordance with embodiments of the disclosed technology.

FIG. 4 is a schematic diagram illustrating an example data schema 130 for a language record 114 in accordance with embodiments of the disclosed technology. As shown in FIG. 4, the data schema 130 can include a default language field 132, a first location field 134, a first new language field 136, a second location field 134', a second new language field 136', a Nth location field 134", and a Nth new language field 136". The default language field 132 can be configured to contain data indicating a default language for outputting the private data 107 (FIG. 2) on the display 104 (FIG. 2) of the computing device 100. The first, second, and Nth location fields 134, 134', and 134" can be configured to contain data corresponding to a continent, region, country, province, state, city, county, or other suitable geographical locations. The first, second, and Nth new language fields 136, 136', and 136" can be configured to contain data individually identifying one or more languages to be used for the corresponding locations in lieu of the default language. Though particular fields are shown in FIG. 4 for illustration purposes, in other embodiments, the data schema 130 can also include suitable fields for a date, time, or other suitable types of data.

FIGS. 5A-5D are flowcharts illustrating processes of securing display data in a computing device 100 in accordance with embodiments of the disclosed technology. Though various embodiments of the processes are described below in the context of the computing device 100, in other embodiments, the processes can also be implemented in computing devices with additional and/or different components.

Figure 5A:
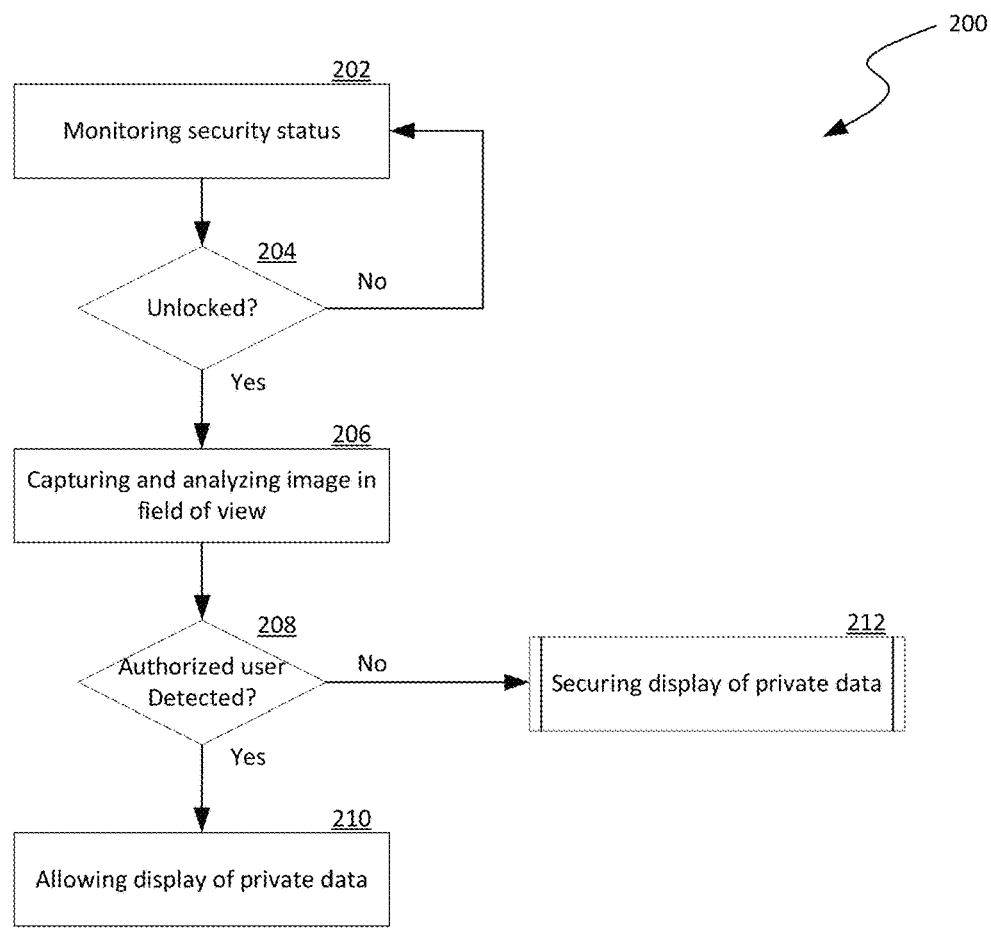
FIGS. 5A-5D are flowcharts illustrating processes of securing display data in a computing device in accordance with embodiments of the disclosed technology.

As shown in FIG. 5A, a process 200 can include monitoring a security status of the computing device 100 at stage 202. In certain embodiments, the security status can indicate that the computing device 100 is locked or unlocked. In other embodiments, the security status can indicate other suitable types of security status of the computing device. The process 200 can then include a decision stage 204 to determine whether the computing device 100 is unlocked. In response to determining that the computing device 100 is locked, the process 200 reverts to continuing monitoring for the security status of the computing device 100 at stage 202. In response to determining that the computing device 100 is unlocked, the process 200 proceeds to capturing and analyzing an image in a field of view of the camera (FIG. 1) of the computing device 100. Various analysis techniques of the image are described in more detail above with reference to FIG. 1.

The process 200 can then include another decision stage 208 to determine whether a face or other suitable anatomical parts of an authorized user is detected in the captured image. In response to determining that the image includes a face or other suitable anatomical parts of an authorized user, the process 200 proceeds to allowing display of private data in a default language, font, font color, or other formatting. In response to determining that the image does not include a face or other suitable anatomical parts of an authorized user, the process 200 proceeds to securing display of private data at stage 212. Various techniques of securing display of the private data are described below with reference to FIGS. 5B-5D.

Figure 5B:
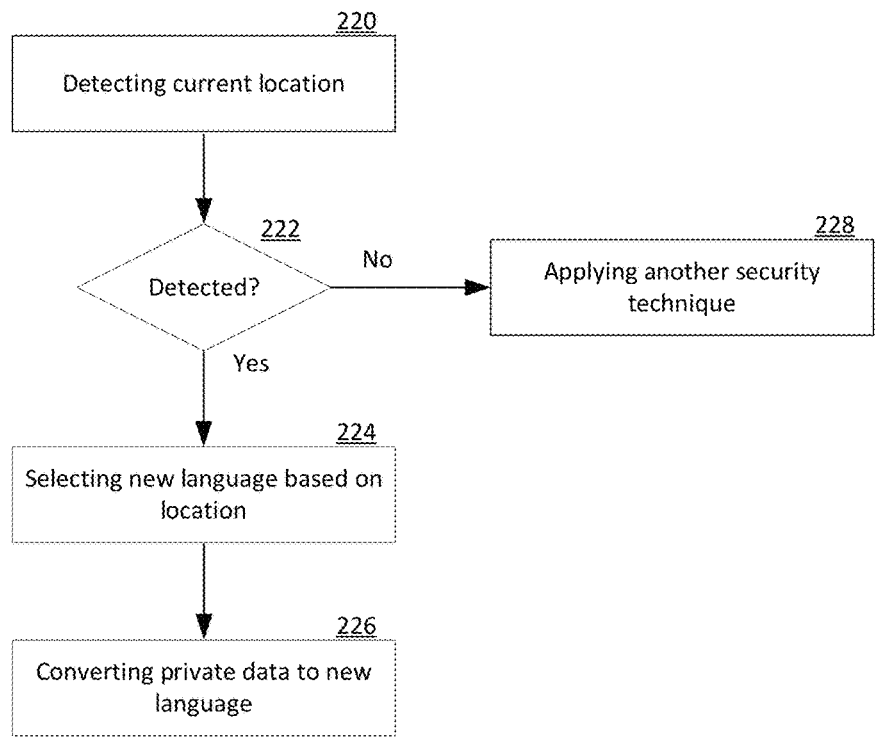

As shown in FIG. 5B, example operations for security display of the private data can include detecting a current location of the computing device 100 at stage 220. The operations can then include a decision stage 222 to determine whether a location is successfully detected. In response to determining that a location is not successfully detected, the operations proceed to applying another security technique at stage 228. Otherwise, the operations proceed to selecting a new language based on the determined location of the computing device 100, as described above in more detail with reference to FIGS. 3A-3D. The operations can then proceed to converting the private data to the new language before allowing the private data to be outputted on the display of the computing device 100 at stage 226.

Figure 5C:
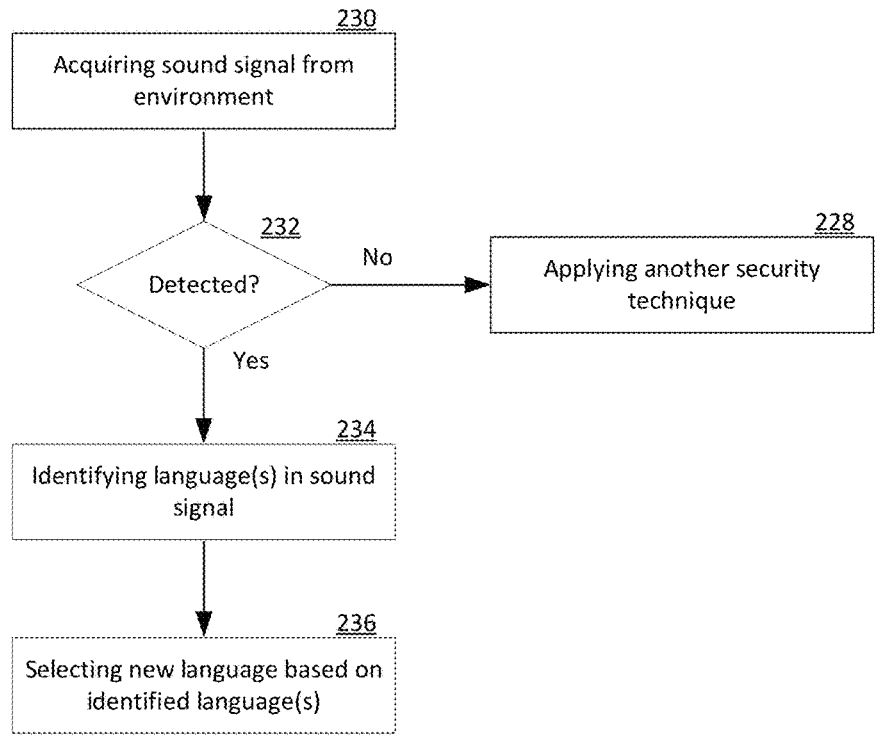

As shown in FIG. 5C, additional example operations for security display of the private data can include acquiring a sound signal from an environment in which the computing device is located at stage 230. The operations can then include a decision stage 232 to determine whether a sound signal is acquired. In response to determining that the sound signal is not successfully acquired, the operations include applying another security technique at stage 228. Otherwise, the operations proceed to identifying one or more languages spoken in the acquired sound signal at stage 234, as described in more detail above with reference to FIG. 3A. The operations can then include selecting a new language based on the identified one or more languages in the sound signal such that the outputted private data in the new language is less likely to be understood by unauthorized users.

Figure 5D:
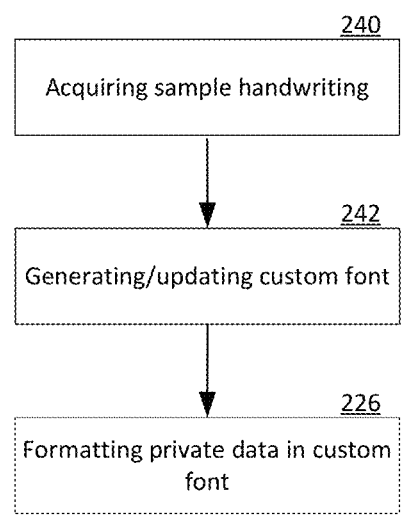

As shown in FIG. 5D, additional example operations for security display of the private data can include acquiring sample handwriting of an authorized user at stage 240. The sample handwriting can be one or more images of handwritten text by the authorized user or other suitable data corresponding to the handwriting of the authorized user. The operations can then include generating or updating a custom font based on the sample handwriting from the authorized user at stage 242. The operations can then include formatting the private data in the custom font before allowing the private data to be outputted on the display of the computing device 100 at stage 226.

FIG. 6 is a computing device 300 suitable for certain components of the computing system 100 in FIGS. 1-3D. For example, the computing device 300 can be suitable for the computing device 100 of FIGS. 1-3D. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A computer-implemented method comprising:
   capturing an image in a field of view of a camera of a computing device;
   identifying a location of the computing device;
   determining, using facial recognition on the image, a human face is that of an unauthorized user of the computing device; and
   in response to determining that the human face is of the unauthorized user of the computing device, modifying at least a portion of displayed content on a display of the computing device from an original language to a different language based on an adoption rate of the different language in the location of the computing device, wherein the adoption rate of the different language is less than an adoption threshold at the location of the computing device.

2. The computer-implemented method of claim 1, wherein the location of the computing device is identified via a global position system (GPS) sensor.

3. The computer-implemented method of claim 1, wherein the different language has a lowest adoption rate at the location of the computing device.

4. The computer-implemented method of claim 1, further comprising:
   determining a race or ethnicity of the unauthorized user based on facial attributes of the human face in the image; and
   selecting the different language that is unfamiliar to the race or ethnicity of the unauthorized user based on the adoption threshold.

5. The computer-implemented method of claim 1, further comprising:
   comparing a facial attribute of the human face in the image with a facial identification library;
   based on the comparison, identifying the unauthorized user;
   determining a language associated with the unauthorized user; and
   selecting the different language that is different from the language associated with the unauthorized user.

6. The computer-implemented method of claim 1, wherein the computing device further comprises a microphone, the method further comprising:
   acquiring a sound signal via the microphone from an environment in which the computing device is located;
   identifying a language spoken in the environment from the acquired sound signal; and
   selecting the different language that is different from the language spoken in the environment.

7. The computer-implemented method of claim 1, further comprising:
   creating a custom font by parsing a hand-written sample text of an authorized user of the computing device, wherein the at least the portion of the displayed content on the display of the computing device is modified to the different language in the custom font.

8. A computing device comprising:
   a camera;
   a display; and
   a processor operatively coupled to the camera, display, and a memory having instructions executable by the processor to cause the computing device to:
      capture an image in a field of view of the camera of the computing device;
      identify a location of the computing device;
      determine, using facial recognition on the image, a human face is that of an unauthorized user of the computing device; and
      in response to determining that the human face is of the unauthorized user of the computing device, modify at least a portion of content displayed on the display of the computing device from an original language to a different language based on an adoption rate of the different language in the location of the computing device, wherein the adoption rate of the different language is less than an adoption threshold at the location of the computing device.

9. The computing device of claim 8, wherein the location of the computing device is identified via a global position system (GPS) sensor.

10. The computing device of claim 8, wherein the different language has a lowest adoption rate at the location of the computing device.

11. The computing device of claim 8, wherein the processor further causes the computing device to:

determine a race or ethnicity of the unauthorized user based on facial attributes of the human face in the image; and select the different language that is unfamiliar to the race or ethnicity of the unauthorized user based on the adoption threshold.

12. The computing device of claim 8, wherein the processor further causes the computing device to:

compare a facial attribute of the human face in the image with a facial identification library;

based on the comparison, identify the unauthorized user;

determine a language associated with the unauthorized user; and select the different language that is different from the language associated with the unauthorized user.

13. The computing device of claim 8, further comprising a microphone, wherein the processor further causes the computing device to:

acquire a sound signal via the microphone from an environment in which the computing device is located;

identify a language spoken in the environment from the acquired sound signal; and select the different language that is different from the language spoken in the environment.

14. The computing device of claim 8, wherein the processor further causes the computing device to:

create a custom font by parsing a hand-written sample text of an authorized user of the computing device, wherein the at least the portion of the displayed content on the display of the computing device is modified to the different language in the custom font.

15. A computer readable storage medium associated with a computing device having a camera, a display, and a processor operatively coupled to one another, the computer readable storage medium having instructions executable by the processor to cause the computing device to:

capture an image in a field of view of the camera of the computing device;

identify a location of the computing device;

determine, using facial recognition on the image, a human face is that of an unauthorized user of the computing device; and in response to determining that the human face is of the unauthorized user of the computing device, modify at least a portion of content displayed on the display of the computing device from an original language to a different language based on an adoption rate of the different language in the location of the computing device, wherein the adoption rate of the different language is less than an adoption threshold at the location of the computing device.

16. The computer readable storage medium of claim 15, wherein the different language has a lowest adoption rate at the location of the computing device.

17. The computer readable storage medium of claim 15, wherein the processor further causes the computing device to:

determine a race or ethnicity of the unauthorized user based on facial attributes of the human face in the image; and select the different language that is unfamiliar to the race or ethnicity of the unauthorized user based on the adoption threshold.

18. The computer readable storage medium of claim 15, wherein the processor further causes the computing device to:

compare facial attributes of the human face in the image with a facial identification library;

based on the comparison, identify the unauthorized user;

determine a language associated with the unauthorized user; and select the different language that is different from the language associated with the unauthorized user.

19. The computer readable storage medium of claim 15, further comprising a microphone, wherein the processor further causes the computing device to:

acquire a sound signal via the microphone from an environment in which the computing device is located;

identify a language spoken in the environment from the acquired sound signal; and select the different language that is different from the language spoken in the environment.

20. The computer readable storage medium of claim 15, wherein the processor further causes the computing device to:

create a custom font by parsing a hand-written sample text of the authorized user of the computing device, wherein the at least the portion of the displayed content on the display of the computing device is modified to the different language in the custom font.

* * * * *